No. 750,339. PATENTED JAN. 26, 1904.
J. A. BINGHAM.
ATTACHMENT FOR DOUBLE DISK GRAIN DRILLS.
APPLICATION FILED JULY 6, 1903.
NO MODEL.
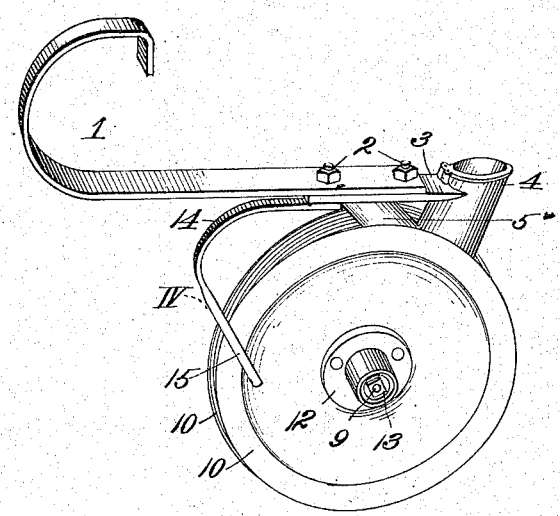
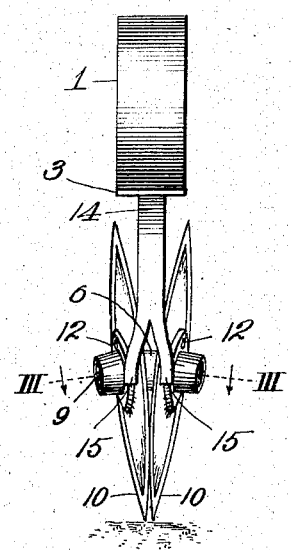
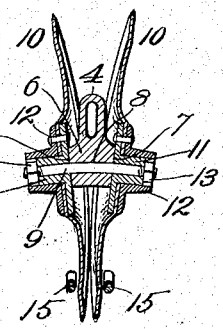
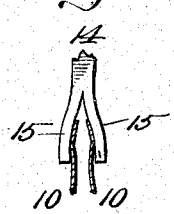
Witnesses:
A. W. Arthur
H. C. Rodgers
Inventor:
J. A. Bingham
By George J. Thorpe
Atty.

No. 750,339. Patented January 26, 1904.

UNITED STATES PATENT OFFICE.

JAMES A. BINGHAM, OF LAHOMA, OKLAHOMA TERRITORY.

ATTACHMENT FOR DOUBLE-DISK GRAIN-DRILLS.

SPECIFICATION forming part of Letters Patent No. 750,339, dated January 26, 1904.

Application filed July 6, 1903. Serial No. 164,305. (No model.)

*To all whom it may concern:*

Be it known that I, JAMES A. BINGHAM, a citizen of the United States, residing at Lahoma, in the county of Garfield and Territory of Oklahoma, have invented certain new and useful Improvements in Attachments for Double-Disk Grain-Drills, of which the following is a specification.

My invention relates to attachments for double-disk grain-drills. In all machines of this character with which I am familiar having disks converging forward so as to produce a narrow furrow to receive the grain there is an amount of wear upon the hubs of such disks which permits them to gradually swing apart at their front ends until in a comparatively short time their front sides are disposed some distance apart and leave a ridge between them upon which the grain falls and is not properly covered by the appliances following the disks.

The object of my invention is to produce a guard attachment which reliably maintains the disks in their original positions by eliminating in a large measure their tendency to twist and impose undue friction on their hubs.

A further object is to produce a guard attachment of this character which is of simple, strong, durable, and compact construction and which can be easily and quickly secured in or removed from position.

To these ends the invention consists in certain novel and peculiar features of construction and combinations of parts, as hereinafter described and claimed, and in order that it may be fully understood reference is to be had to the accompanying drawings, in which—

Figure 1 is a perspective view of a pair of disks which converge forward and are equipped with a guard attachment embodying my invention. Fig. 2 is a front view of the same. Fig. 3 is a horizontal section taken on the line III III of Fig. 2. Fig. 4 is a section taken on the dotted line IV of Fig. 1.

Referring to the drawings in detail, 1 designates a bar adapted to extend longitudinally of the drill and be attached at its front or curved end to the drill-framework in any suitable or preferred manner, such framework not being shown in this application, as it has no bearing on the invention. Bolted, as at 2, to the rear end of said bar is the forwardly-projecting flange 3 of the drill-tube 4, said flange being braced from the drill-tube by the arm 5 or in any other suitable or preferred manner. The lower end of the tube is formed with an enlargement or hub 6 at its front side, having its side faces 7 converging in a forward direction, and extending transversely through said enlargement is a passage 8, wherein the angular portion of a shaft or axle 9 snugly and non-rotatably fits, the end portions of said shaft projecting beyond the sides of the enlargement and at right angles to said sides.

10 designates a pair of disks which converge forward at the same angle as enlargement-faces 7 and are journaled upon the projecting ends of said shaft. The preferred construction is to secure the disk between the flanges of an inner flanged hub 11 and an outer flanged hub 12, a retaining-nut 13 engaging each end of the shaft and clamping against the ends of the inner hubs to hold the disks with the inner sides of said last-named hubs flatly against the converging faces of the enlargement or hub.

In practice the relation and proportion of the disks is such that their front edges just about come together in the plane of the surface of the ground, so that as the drill is drawn across the field a narrow furrow is made to receive the grain, the disks ordinarily turning, owing to their angular relation, with great frictional pressure against the enlargement or hub 6. This pressure in a machine not equipped with my guard attachment or its equivalent very quickly grinds out the hubs in such a manner that the disks gradually assume a parallel relation, which relation destroys their usefulness for quick and accurate planting.

As set forth in the statement of invention, my object is to relieve the disk-hubs of this undue wear, and thus materially increase their effectiveness of operation and their period of service. My attachment is preferably in the form of a spring-steel bar bent to substantially U shape, as at 14, and secured at its upper end to flange 3 by one of the bolts 2. Its lower end is split or bifurcated to form a fork, with its tines 15 extending downward and slightly rearward and bearing lightly against the outer sides of the disks, preferably at their extreme outer edges, where they impose only a very light pressure, but have sufficient leverage to easily maintain the disks in their original angular relation, and thus relieve their hubs of undue wear where they bear against the converging faces of the enlargement or hub, and in order that the period of service of the guard may be as long as possible its forked end at least will be hardened.

From the above description it will be apparent that I have produced a guard attachment for double-disk grain-drills which embodies the features of advantage enumerated as desirable in the statement of invention and which is susceptible of minor changes without departing from the principle of construction involved.

Having thus described the invention, what I claim as new, and desire to secure by Letters Patent, is—

1. The combination of a pair of forward-converging grain-drill disks, and a guard attachment suitably supported and having its lower end forked and extending downward and rearward, the tines of its fork frictionally engaging the outer sides of the disks.

2. The combination of a grain-drill tube provided with an enlargement at its lower front end having its opposite sides converging forward, a shaft carried by said enlargement and projecting beyond and at right angles to said sides, disks journaled upon said projecting ends and bearing against said sides, nuts engaging the shaft to hold the disks in place, and a guard attachment supported from the drill-tube and having its lower portion forked and extending downward and rearward, and bearing lightly against the outer sides of the disks.

In testimony whereof I affix my signature in the presence of two witnesses.

JAMES A. BINGHAM.

Witnesses:
 CHAS. C. DE PUE,
 JOHN B. POW.